United States Patent [19]

Pudney et al.

[11] Patent Number: 5,200,956
[45] Date of Patent: Apr. 6, 1993

[54] COMMUNICATIONS SYSTEM FOR DATA TRANSMISSION OVER A TIME DIVISION DUPLEX FREQUENCY CHANNEL

[75] Inventors: Christopher D. Pudney, Smallfield; Frank C. G. Owen, Petts Wood, both of England

[73] Assignee: U.S. Philips Corporation, New York, N.Y.

[21] Appl. No.: 528,016

[22] Filed: May 22, 1990

[30] Foreign Application Priority Data

May 26, 1989 [GB] United Kingdom ............... 8912175

[51] Int. Cl.$^5$ .............................................. H04J 3/16
[52] U.S. Cl. .................................. 370/95.1; 370/95.3; 370/84; 370/50
[58] Field of Search .................. 370/95.1, 95.3, 79, 370/84, 29, 85.7, 110.1, 111.1, 110.4, 50, 45; 340/825.01; 455/33

[56] References Cited

U.S. PATENT DOCUMENTS

| | | | |
|---|---|---|---|
| 4,556,972 | 12/1985 | Chan et al. | 370/95.1 |
| 4,638,479 | 1/1987 | Alexis | 455/33 |
| 4,656,645 | 4/1987 | Kaneko | 340/825.01 |
| 4,785,450 | 11/1988 | Bolgiano et al. | 370/95 |
| 4,831,373 | 5/1989 | Hess | 455/33 |

FOREIGN PATENT DOCUMENTS 0261127 12/1989 European Pat. Off. .
8404435 11/1990 PCT Int'l Appl. .

Primary Examiner—Curtis Kuntz
Assistant Examiner—T. Ghebretinsae
Attorney, Agent, or Firm—Anne E. Barschall

[57] ABSTRACT

A communication system such as a digital cordless telephone system comprises primary (or base) stations (PS) and secondary stations (SS). The primary stations over a local area are coupled to a system controller (14 or 15) which interfaces with the PSTN. A TDMA method is used for forward and reverse transmissions between a primary and a secondary station. For digitized speech transmission normally one duplex voice channel formed by one forward time slot (or physical channel) and one reverse time slot (or physical channel) in each frame is allocated for the transaction. For fast data rates it is desirable that additional duplex voice channels be made available quickly for the transmission of a fast data message, after which the additional duplex voice channels can be relinquished. In order to facilitate the rapid set-up of a data transaction, a map store in each data secondary station lists the usage and quality of all the duplex voice channels. The secondary station, when ready to transmit data, immediately uses additional duplex voice channels from those listed, thus avoiding the necessity of scanning all the duplex voice channels before deciding on which additional duplex voice channels to attempt to transmit in.

14 Claims, 2 Drawing Sheets

COMMUNICATIONS SYSTEM FOR DATA TRANSMISSION OVER A TIME DIVISION DUPLEX FREQUENCY CHANNEL

BACKGROUND OF THE INVENTION

The present invention relates to a communications system for data transmission over a time division duplex (TDD) frequency channel, for example in a digital cordless telephone system having time division multiple access (TDMA) protocol.

FIGS. 1 and 2 of the accompanying drawings illustrate respectively an example of a digital cordless telephone system and the channel and message structure.

The digital cordless telephone system comprises a plurality of primary or base stations PS of which four, PS1, PS2, PS3 and PS4, are shown. Each of the primary stations is connected by way of a respective wideband landline link 10, 11, 12 and 13, capable of carrying data at a rate of say 1.152 Mbits/sec. to cordless telephone system controllers 14 and 15. The system controllers 14 and 15 are, in the illustrated embodiment, connected to the PSTN which is constituted by an ISDN (Integrated Services Digital Network) link.

The system further comprises a large plurality of secondary stations SS some of which, SS1, SS2, SS4 and SS5, are hand portable and are used for digital time division duplex speech communication only. Others, for example SS3 and SS6, are data terminals which also are capable of duplex data communication. Duplex communication between the secondary stations within an area covered by a system controller and/or the PSTN is by way of radio through the primary stations PS. Accordingly the primary and secondary stations each comprise a radio transmitter and receiver.

Referring to FIG. 2, the illustrated system has five radio channels, hereinafter referred to as frequency channels C1 to C5, each capable of carrying digitised speech or data at 1.152 Mbits/sec. The adjacent frequency channel separation is 1.728 MHz. Each frequency channel is divided in the time domain into 10 ms frames. Each frame is divided into 24 time slots (or physical channels) of which the first twelve F1 to F12 are allocated for transmission in a forward direction, that is from a primary station to a secondary station, and the second twelve R1 to R12 are allocated for transmission in the reverse direction. The forward and reverse time slots are twinned, that is, the correspondingly numbered forward and reverse time slots, for example F4, R4, comprise a twin which hereinafter will be referred to as a duplex voice channel. In setting-up a call between a primary and a secondary station, a duplex voice channel is assigned to the transaction. The assignment of the duplex voice channel in any of the frequency channels C1 to C5 is by the method of dynamic channel allocation whereby a secondary station taking account of its radio environment negotiates with the primary station for access to the best duplex voice channel currently available under the control of the primary station. The system controller 14 or 15 will effect error detection and correction to data received by any one of the primary stations to which it is connected. Error control of the digitised speech is performed by the primary stations.

The general structure of a message is also shown in FIG. 2. The message structure comprises two bytes of preamble 16, two bytes of a synchronisation sequence 18, eight bytes of signalling data 20 and forty bytes of digitised speech or data 22. The digitisation rate and data rate is 32 kbits/sec. Both the primary and secondary stations include a buffer to compress the 32 kbits/sec. data to bursts of data at 1.024 Mbits/sec. so that it is suitable for transmission.

The basic protocol for a transmission which is to be initiated by a secondary station SS is for it to listen to all the forward physical channels in each of the frequency channels C1 to C5 and ascertain which duplex voice channels are busy and idle and the relative signal quality in these duplex voice channels. From the information derived the secondary station determines what it believes is the best duplex voice channel and transmits in the reverse physical channels of the duplex voice channel to a particular primary station PS. The signalling details 20 in the message together with the details 22 in the initial transmission are decoded and passed to the system controller 14 or 15 which sets-up the fixed network connection. The primary station confirms that the particular duplex voice channel has been assigned to the transaction.

In the forward direction, the primary stations send paging messages to the addressed secondary stations in say every sixteenth frame. Such an arrangement enables the secondary stations to "sleep" during at least the intervening fifteen frames thereby economising on power. An addressed secondary station in response to a paging request addressed to it will, unless a duplex voice channel has been assigned, transmit on the reverse time slot of the best duplex voice channel. As a general rule the system protocol will give priority to speech over data.

For data transmission at data rates of the order of 32 kbits/sec. then transmissions in the forward and reverse directions can proceed in a similar manner to speech. However it is not unusual for a secondary station to generate batches of data at rates in excess of 32 kbits/sec. and also it is desirable for the cordless system to handle higher data rate services such as 2B+D Integrated Services Digital Network (ISDN) which operates at 144 kbits/sec. B equals 64 kbits/sec. and is suited to send fax messages, digitised speech and certain other services over the PSTN (public switched telephone network) and D equals 16 kbits/sec. and is used for signalling involved with call set-up and other routine tasks. Since data rates for ISDN and for other types of data transmission, such as graphics, exceed the capacity of a time slot then either buffering could be used since data tends to be transmitted in bursts or one or more additional duplex voice channels could be assigned to the transmission of a high data rate message. Allowing for retransmissions as a result of detected errors then it is conceivable that even more channel capacity will be required to complete a transaction. If a data transaction uses a disproportionately large amount of each frame then this will reduce access to the duplex voice channels by other users wanting to make speech calls. There are applications such as cordless video phones and computer communications where rapid access to one or more duplex voice channels is required by the nature of the data to be transacted but after having grabbed the additional duplex voice channels they are not retained for longer than is necessary after which they are available for other system users. Dynamic channel allocation imposes an undesired time overhead and it is an object of the present invention to reduce this overhead.

SUMMARY OF THE INVENTION

According to a first aspect of the present invention there is provided a communications system comprising at least one primary station and at least one secondary station, communication between a primary station and a secondary station being by way of a radio channel which is divided in the time domain into a succession of frames, each frame comprising a first sequence of n time slots (or physical channels) allocated for transmission in a first direction between a primary station and a secondary station and a second sequence of n time slots (or physical channels) allocated for transmission in a second direction, opposite to the first direction, pairs of time slots formed by a time slot in the first sequence and a time slot in the second sequence forming duplex voice channels which are usable for communication between a primary and a secondary station, wherein at least one secondary station comprises a map store for storing indicia relating to the usage of the duplex voice channels, and wherein said at least one secondary station when requiring more than one duplex voice channel for the transmission of data, substantially immediately transmits also in at least one additional duplex voice channel selected from those duplex voice channels in its map store which are available for use.

By a secondary station maintaining a map of lesser used or available duplex voice channels, it can immediately initiate transmissions in the return direction in those duplex voice channels which it knows are available without incurring the delay and the time overhead of listening to all the forward physical channels and ascertaining if there is radio traffic above a certain threshold in the respective physical channels and then initiating a call to the primary station in a reverse physical channel of a duplex voice channel which is deemed to be available. An approach based on making use of duplex voice channels which are already known to be available is likely to give a high probability of success coupled with near instant access.

In the event of the system operating on two or more frequency channels, then the map store may list the lesser used duplex voice channels in each frequency channel and the at least one secondary station may request assignment of a duplex voice channel from those listed in its map store which are from a frequency channel other than from the frequency channel already assigned to the secondary station.

If desired, the at least one secondary station may comprise means for measuring signal quality and wherein an indication of the quality of the or each duplex voice channel may be stored in the map store together with the indicia relating to non-assigned duplex voice channels.

The primary station may comprise means for providing information about its local radio environment and means for periodically transmitting said local radio environment information. The at least one secondary station may have means for storing the primary station's local environment information and for providing an indication of the quality of the or each duplex voice channel which is stored in the map store together with indicia relating to the lesser used duplex voice channels.

If desired, the at least one secondary station may cross-correlate information about the signal quality in the or each duplex voice channel with the local radio environment information relating to the or each duplex voice channel to obtain an indication of the overall quality of the or each duplex voice channel, which indications are stored in the map store together with indicia relating to the lesser used duplex voice channels.

In an embodiment of the present invention, the at least one secondary station has control means for determining from the information in the map store which are the better duplex voice channels. In operation the control means updates the list in the map store together with the quality information relating to the stored lesser used duplex voice channels.

Control means may be coupled to the primary station for controlling the assignment of lesser used duplex voice channels, and for signalling details of lesser used duplex voice channels to the at least one secondary station by way of the primary station.

If desired, details relating to the usability of duplex voice channels may be included in the signalling portion of a message communicated by the at least one primary station to the at least one secondary station.

According to a second aspect of the present invention, there is provided a secondary station for use in the communications system in accordance with the present invention, comprising a radio transmitter and receiver, a map store for storing indicia relating to the usage of the duplex voice channels, means for generating a data message, and control means responsive to said means indicating that it has a data message ready for transmission for instructing the transmitter to transmit substantially immediately in at least one of the duplex voice channels listed in the map store.

BRIEF DESCRIPTION OF THE DRAWING

The present invention will now be explained and described, by way of example, with reference to the accompanying drawings wherein.

In the drawings the same reference numerals have been used to identify corresponding features.

DESCRIPTION OF THE PREFERRED EMBODIMENTS

Figure 1:
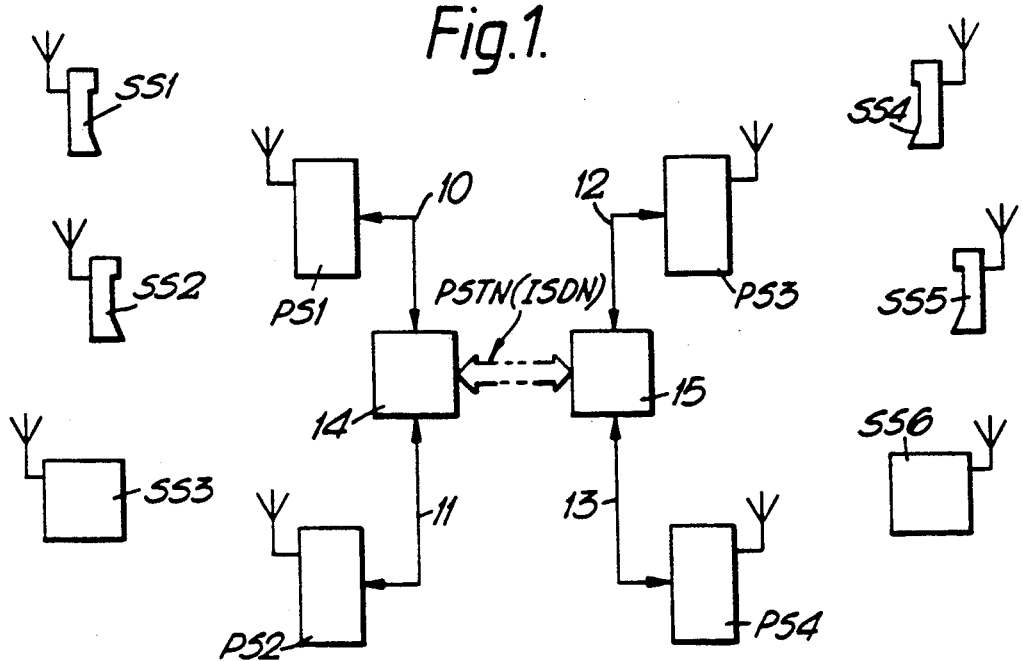
FIG. 1 is a block schematic diagram of the already described example of a TDMA cordless telephone system.

An aspect of data communication is that it is not unusual for a secondary station SS3 or SS6 (FIG. 1) to generate batches of data, or for a system controller to have batches of data, at rates in excess of 32 kbits/sec. Also, if the system is to be able to utilise an ISDN fixed wired link, then, unless buffering is used, the system must be able to supply data at a rate of 144 kbits/sec. at a suitable bit error rate. In accordance with the present invention it is proposed, subject to availability, to assign more than one duplex voice channel to a data transaction so that data transmission can be in parallel duplex voice channels. The additional duplex voice channel(s) can be in other frequency channels but for general convenience will have different slot numbers. However, in view of the fact that data is transmitted in bursts it is undesirable for duplex voice channels to be assigned for the complete call duration as there will be periods of time when there will be no transmissions. Accordingly, in the interests of efficiency, duplex voice channels should be surrendered after the completion of the transmitted burst but at the same time when a data packet is ready for transmission in the forward and/or reverse direction it is desirable for the required number of duplex voice channels to be made available quickly to the transaction. However, the ISDN link may be maintained for the duration of the transaction.

Figure 3:
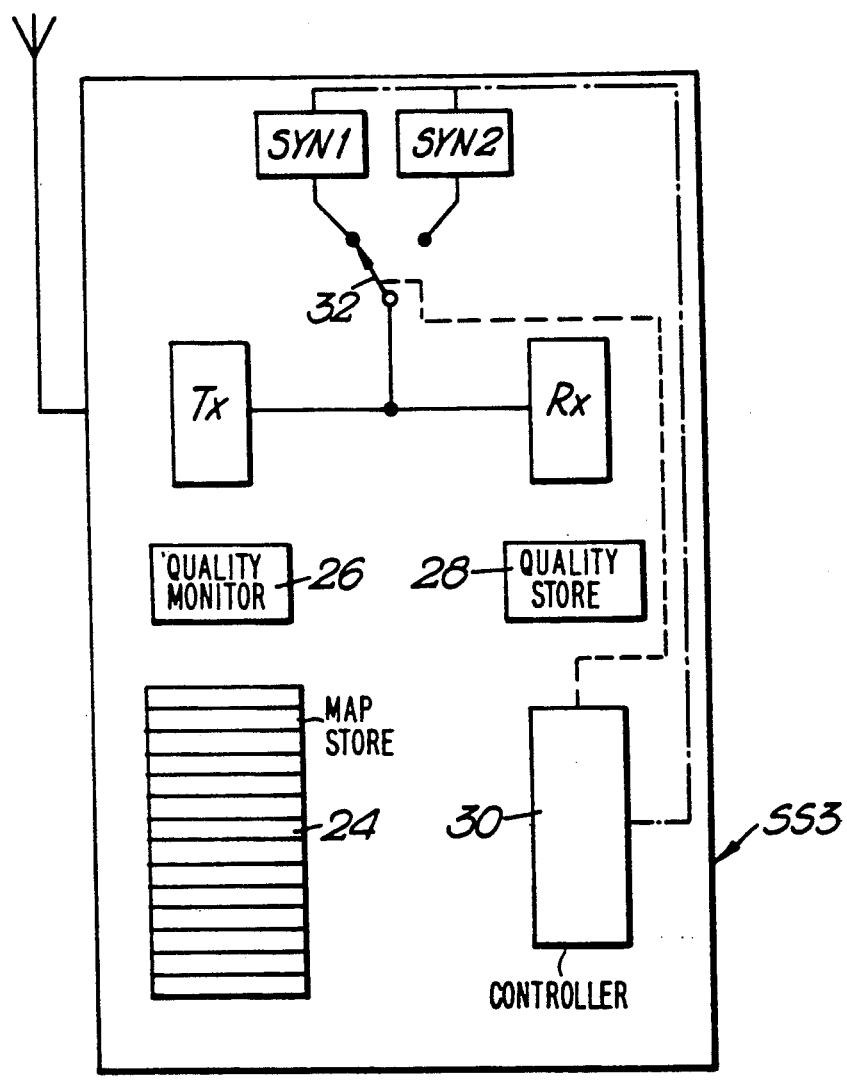
FIG. 3 is a block schematic diagram of a primary or secondary station suitable for use with the method in accordance with the present invention.

Accordingly in order to expedite access of the primary or secondary station, the station comprises a map store 24, FIG. 3, in which are stored indicia relating to the usage of all the duplex voice channels. Then when the station wants to initiate a call, instead of having to scan all the frequency channels for lesser used duplex voice channels, it can select the required duplex voice channel(s) from those listed in the map store 24 and can utilise them immediately in anticipation of a high probability of being successful. A primary station (FIG. 1) will confirm that the additional duplex voice channels can be utilised. Details of what duplex voice channels are not usable can be relayed by the system controller to the primary and/or secondary station, via the primary stations either in an idle time slot or as part of the signalling portion of a message. It is anticipated that each primary station will transmit in a forward slot (or physical channel) in each frame regardless of whether it is involved in a transaction. Since data secondary stations as well as the primary stations will be generally fixed and powered from the mains, they can remain continuously energised and thereby receive this information quickly. Generally a secondary station will transmit to the primary station producing the best or strongest signal.

Conversely, when a batch of data is ready to be transmitted in the forward direction, a primary station looks for and finds the best, currently available duplex voice channel in its own map store and can, because the data secondary station (as well as the primary station) is continuously "awake", transmit a paging message immediately in a signalling portion of a message without waiting for the next sixteenth frame. The paging or call set-up messages may contain the number of duplex voice channels required and/or suggested duplex voice and frequency channel numbers.

Figure 2:
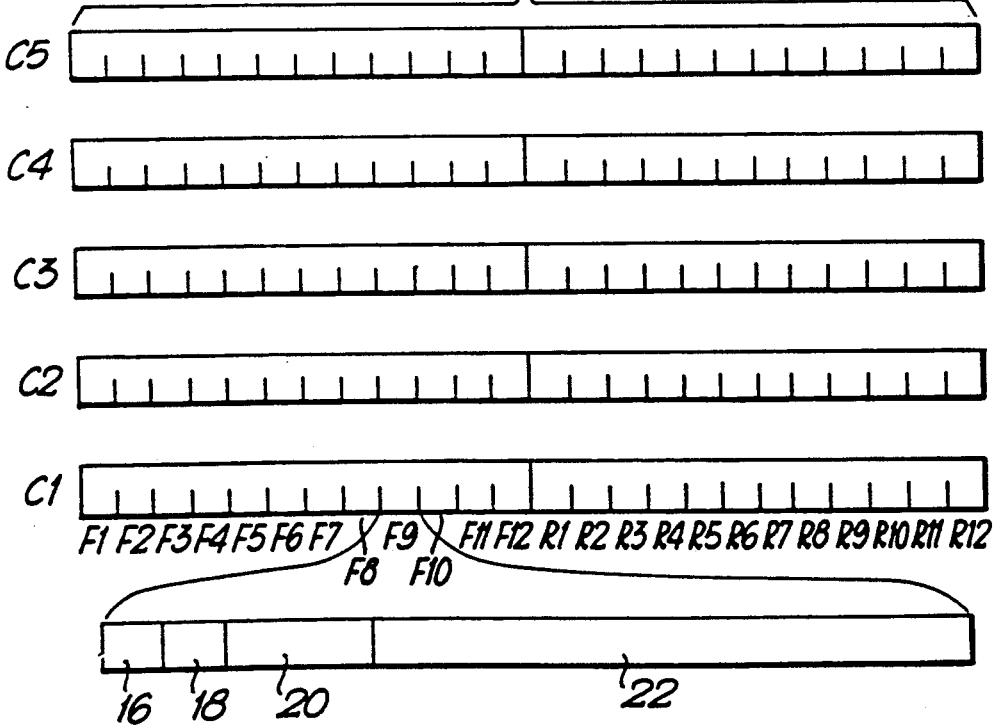
FIG. 2 is a diagram illustrating the frame and slot structure of the system shown in FIG. 1.

In view of the fact that it is unlikely that concatenated physical channels will be assigned to a data transaction then the data will be transmitted as packets, each having packet identification. Since such packets may be transmitted using more than one primary station, then in the case of forward data transmissions, the received message has to be assembled at the addressed secondary station which must be capable of carrying out error detection and correction and requesting retransmission of corrupted data. In the case of reverse data transmissions the primary station will pass on the data packets transparently to the system controller 14 or 15 which will implement error detection and correction and request retransmission of corrupted data packets. If desired the signalling data 20 (FIG. 2) may be passed to the system controller to aid error checking.

In order to minimise the amount of data which has to be retransmitted due to poor channel quality, the secondary station SS3 (FIG. 3) includes means 26 for measuring the strengths and/or quality of signals in the forward and reverse time slots (or physical channels) and also stores an indication of the quality of the lesser used slots in the map store 24.

Additionally or alternatively, the primary stations monitor their local radio enviroment and, when signalling details of the lesser used duplex voice channels, an indication of the quality of local radio environment is also sent. Such indications may comprise a subset of the best or poorest duplex voice channels. These indications are stored in a store 28 provided in the secondary station SS3. A control section 30 of the secondary station SS3 correlates the signal strength/quality measurements with the primary stations' local environment information and arranges (or rearranges) the listing of the lesser used physical channels with the best (or better) pairs at or near the top of the list.

In view of the fact that the primary or secondary station may be operating on any one of the frequency channels C1 to C5 for a short duration before it is switched to another frequency channel, it is necessary for it to be frequency agile. One convenient way of achieving this agility would be for the radio frequency section of the primary and/or secondary station to have a local oscillator frequency generating means comprising two frequency synthesisers SYN1, SYN2 controlled by the control section 30. Switching means 32 operable by the control section switches SYN1 and SYN2 alternately allow operation in adjacent slots on different frequency channels. The frequency synthesiser not currently switched into the circuit, that is SYN2 in FIG. 3, is retuned to another frequency channel whilst SYN1 is still in the circuit.

In a non-illustrated embodiment, each frequency channel has its own continuously running local oscillator and switching means are provided for connecting the respective local oscillator into the circuit when required.

From reading the present disclosure, other modifications will be apparent to persons skilled in the art. Such modifications may involve other features which are already known in the design, manufacture and use of cordless telephone systems, secondary stations and component parts thereof and which may be used instead of or in addition to features already described herein. Although claims have been formulated in this application to particular combinations of features, it should be understood that the scope of the disclosure of the present combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A communication system comprising: at least one primary station having a transmitter and receiver and at least one secondary station having a transmitter and receiver, a radio frequency channel providing communication between a primary station and a secondary station with said radio frequency channel divided in the time domain into a succession of frames, each frame comprising 2n time slots, where n is an integer, wherein a sequence comprising the first n of said 2n time slots is allocated for transmission in a first direction between a primary station and a secondary station and another sequence comprising the remaining n time slots is allocated for transmission in a second direction, opposite to the first direction, time slots x, where x is an integer between 1 and n, and (x+n) in each frame of 2n time slots forming a duplex voice channel, wherein each said station includes means for determining the usage of the duplex voice channels and a station wishing to transmit a signal determines which of any available duplex voice channels is acceptable and transmits in its respective time slot, wherein at least one secondary station comprises a map store for storing indicia relating to the usage of the duplex voice channels and control means for determining that the station has a data message for transmission and that the data rate of the message exceeds that of a duplex voice channel, said control means, upon determining that the data rate of the message exceeds that of a duplex voice channel, selects at least one additional duplex voice channel from those which are stored in its map store as being available for use, causing non-identical packets of the data message to be transmitted substantially in parallel in at least two of said duplex voice channels and relinquishing said at least one additional duplex voice channel following transmission of the data message.

2. A system as claimed in claim 1, characterised in that there are at least two of said radio frequency channels, the map store lists the lesser used duplex voice channels in each frequency channel, and said at least one secondary station can transmit in a duplex voice channel listed in its map store and which is from a frequency channel other than from the frequency channel already assigned to the secondary station.

3. A system as claimed in claim 1, characterised in that the at least one secondary station comprises means for measuring signal quality and in that an indication of the quality of the or each duplex voice channel is stored in the map store together with the indicia relating to the current usage of the duplex voice channels.

4. A system as claimed in claim 1, characterised in that the primary station comprises means for providing information about its local radio environment and means for periodically transmitting said local radio environment information, and in that the at least one secondary station has means for storing said local radio environment information and for providing an indication of the quality of the or each duplex voice channel, which indication is stored in the map store together with indicia relating to the current usage of the duplex voice channel.

5. A system as claimed in claim 1, characterised in that the primary station comprises means for providing information about its local radio environment and means for periodically transmitting said local radio environment information, and in that the at least one secondary station comprises means for storing said local radio environment information, means for measuring the quality of signals in the respective time slots forming the duplex voice channel, means for storing indications of each of the measured signal quality, means for cross-correlating the stored local radio environment information with the stored indications of each of the measured signal quality and obtaining an indication of the overall quality of the or each duplex voice channel, which indications are stored in the map store together with the indicia relating to the usage of the duplex voice channels.

6. A system as claimed in claim 3, characterised in that said control means includes means for determining from the information in the map store which are the better duplex voice channels.

7. A system as claimed in claim 6, characterised in that said control means updates the list in the map store together with the quality information relating to the stored, lesser used said duplex voice channels.

8. A system as claimed in claim 1, characterised by control means coupled to the primary station for controlling the assignment of the lesser used duplex voice channels, and means for signalling details of the lesser used duplex voice channels to the at least one secondary station by way of the base station.

9. A system as claimed in claim 1, characterised in that details relating to the usability of duplex voice channels are included in the signalling portion of a message communicated by the at least one primary station to the at least one secondary station.

10. A secondary station for use in a communication system as claimed in claim 1, comprising; a radio transmitter and receiver, means for determining the usage of the duplex voice channels, a map store for storing indicia relating to the usage of the duplex voice channels, means for receiving an input data message for onward transmission by the transmitter, and control means for determining the presence of the input data message and that the data rate of the message exceeds that of a duplex voice channel, said control means, in response to determining that the data rate of the message exceeds that of the duplex voice channel, selecting at least one additional duplex voice channel from those which are stored in its map store as being available for use, causing non-identical packets of the data message to be transmitted substantially in parallel in at least two of the duplex voice channels and relinquishing said at least one additional duplex voice channel following transmission of the data message.

11. A secondary station as claimed in claim 10, characterised by means for measuring the quality of radio transmissions from a primary station, said means providing indications of the signal quality of the duplex voice channels which are stored in the map store together with the indicia.

12. A secondary station as claimed in claim 10, characterised by means for storing details of the primary station's local radio environment as transmitted by a primary station.

13. A secondary station as claimed in claim 11, characterized by means for storing details of the primary station's local radio environment as transmitted by a primary station.

14. A secondary station as claimed in claim 13, characterised by a cross-correlator for correlating the signal quality measurements with the details of the local radio environment and for storing indications of the overall quality of each duplex voice channel in the map store together with the indicia.

* * * * *